United States Patent
Roos et al.

(10) Patent No.: US 12,140,180 B2
(45) Date of Patent: Nov. 12, 2024

(54) THIN SECTION THREE RING BEARING

(71) Applicant: AKTIEBOLAGET SKF, Gothenburg (SE)

(72) Inventors: Robert Clyde Roos, Fruitport, MI (US); William D. Schmidt, Muskegon, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 164 days.

(21) Appl. No.: 17/899,817

(22) Filed: Aug. 31, 2022

(65) Prior Publication Data

US 2024/0068512 A1 Feb. 29, 2024

(51) Int. Cl.
*F16C 19/08* (2006.01)
*F16C 19/55* (2006.01)

(52) U.S. Cl.
CPC .............. *F16C 19/08* (2013.01); *F16C 19/55* (2013.01)

(58) Field of Classification Search
CPC ................................. F16C 19/08; F16C 19/55
See application file for complete search history.

(56) References Cited

U.S. PATENT DOCUMENTS

| | | | |
|---|---|---|---|
| 1,366,966 A | 2/1921 | Spear | |
| 1,506,856 A * | 9/1924 | McCluskey | ............. F16C 43/06 384/461 |
| 1,742,841 A | 1/1930 | Witthofft | |
| 2,789,021 A * | 4/1957 | Pedersen | ............. F16C 33/6677 415/203 |
| 3,452,349 A | 6/1969 | Wood | |
| 6,948,855 B2 * | 9/2005 | Shirasawa | ............. F16C 19/362 384/447 |
| 9,481,376 B2 | 11/2016 | Schmidinger et al. | |
| 11,035,405 B2 * | 6/2021 | Capoldi | ................... F16C 19/56 |
| 11,149,788 B2 * | 10/2021 | McNeil | ..................... B64C 9/02 |
| 11,913,497 B2 * | 2/2024 | Cardwell, III | .......... F16C 25/06 |
| 2006/0210207 A1 * | 9/2006 | Umeda | ............... F16C 33/6633 384/490 |

OTHER PUBLICATIONS

Unpublished U.S. Appl. No. 17/741,058.

* cited by examiner

*Primary Examiner* — James Pilkington
(74) *Attorney, Agent, or Firm* — J-TEK LAW PLLC; Scott T. Wakeman; Mark A. Ussai

(57) ABSTRACT

A bearing assembly includes an inner ring with an inner raceway and disposable about a first member and an outer ring with an outer raceway disposed about the inner ring. A middle ring is disposed between the inner and outer rings and has an inner intermediate raceway and an outer intermediate raceway and is configured to connect with a second member so as to be rotatable about a central axis through the first member. A first set of rolling elements is disposed between the inner ring and the middle ring and a second set of rolling elements is disposed between the outer ring and the middle ring. The outer ring is sized such that a ratio of the outside diameter to the axial width is greater than eight to one (8:1) and the middle ring is formed of a material different than the inner and outer rings.

14 Claims, 5 Drawing Sheets

THIN SECTION THREE RING BEARING

BACKGROUND OF THE INVENTION

The present invention relates to rolling element bearings, and more particularly to rolling element bearings having radially-spaced sets of rolling elements.

Rolling element bearings including two or more radially spaced sets of rolling elements are known and are sometimes referred to as being "radially-nested". Such bearings typically include an inner ring, an outer ring and at least one middle ring disposed radially between the inner and outer rings. A first set of rolling elements is disposed between the inner ring and the middle ring and a second set of rolling elements is disposed between the outer ring and the middle ring.

SUMMARY OF THE INVENTION

In an aspect, the present invention is a bearing assembly for rotatably coupling at least a first member and a second member, the second member being rotatable about a central axis extending through the first member. The bearing assembly comprises an inner ring disposable about the first member and having an inner raceway, and an outer ring disposed about the inner ring and disposable within a bore of the first member or within a bore of a third member disposed about the first member, the outer ring having an outer raceway. A middle ring is disposed between the inner ring and the outer ring and has an inner intermediate raceway facing the inner raceway and an outer intermediate raceway facing the outer raceway, the middle ring being configured to connect with the second member so as to be rotatable about the central axis. A first set of rolling elements is disposed between the inner ring and the middle ring so as to be rollable along the inner raceway and along the inner intermediate raceway during rotation of the middle ring. A second set of rolling elements disposed between the outer ring and the middle ring so as to be rollable along the outer raceway and along the outer intermediate raceway during rotation of the middle ring. The outer ring has an outside diameter and an axial width and is sized such that a ratio of the outside diameter to the axial width is greater than eight to one (8:1), so as to thereby minimize an axial space required to install the bearing assembly within the first member or between the first member and the third member and/or the middle ring is formed of a material different than a material of the inner ring and different than a material of the outer ring.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
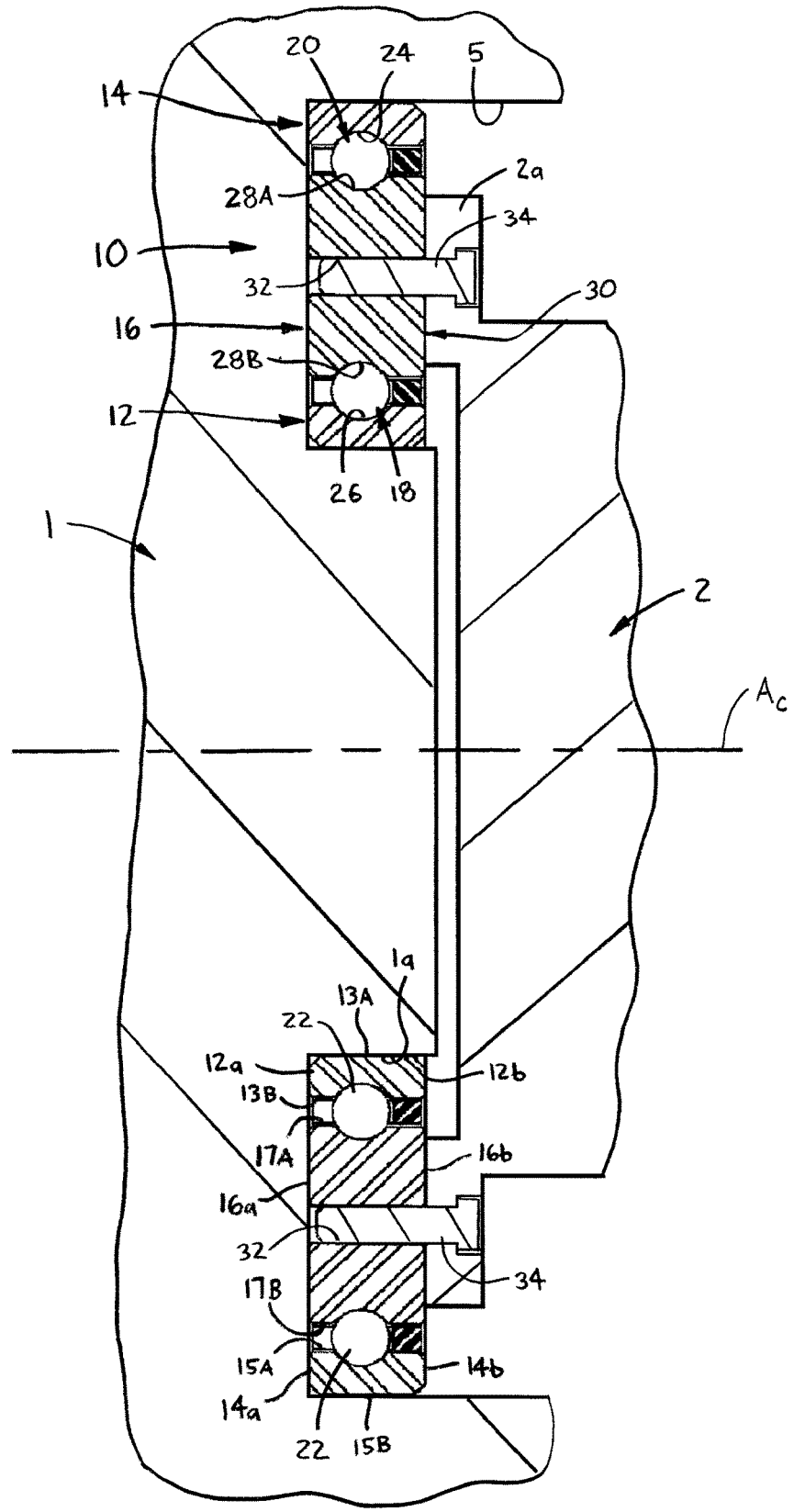
FIG. 1 is a broken-away, axial cross-sectional view of a bearing assembly in accordance with the present invention, shown rotatably coupling first and second members.
Figure 2:
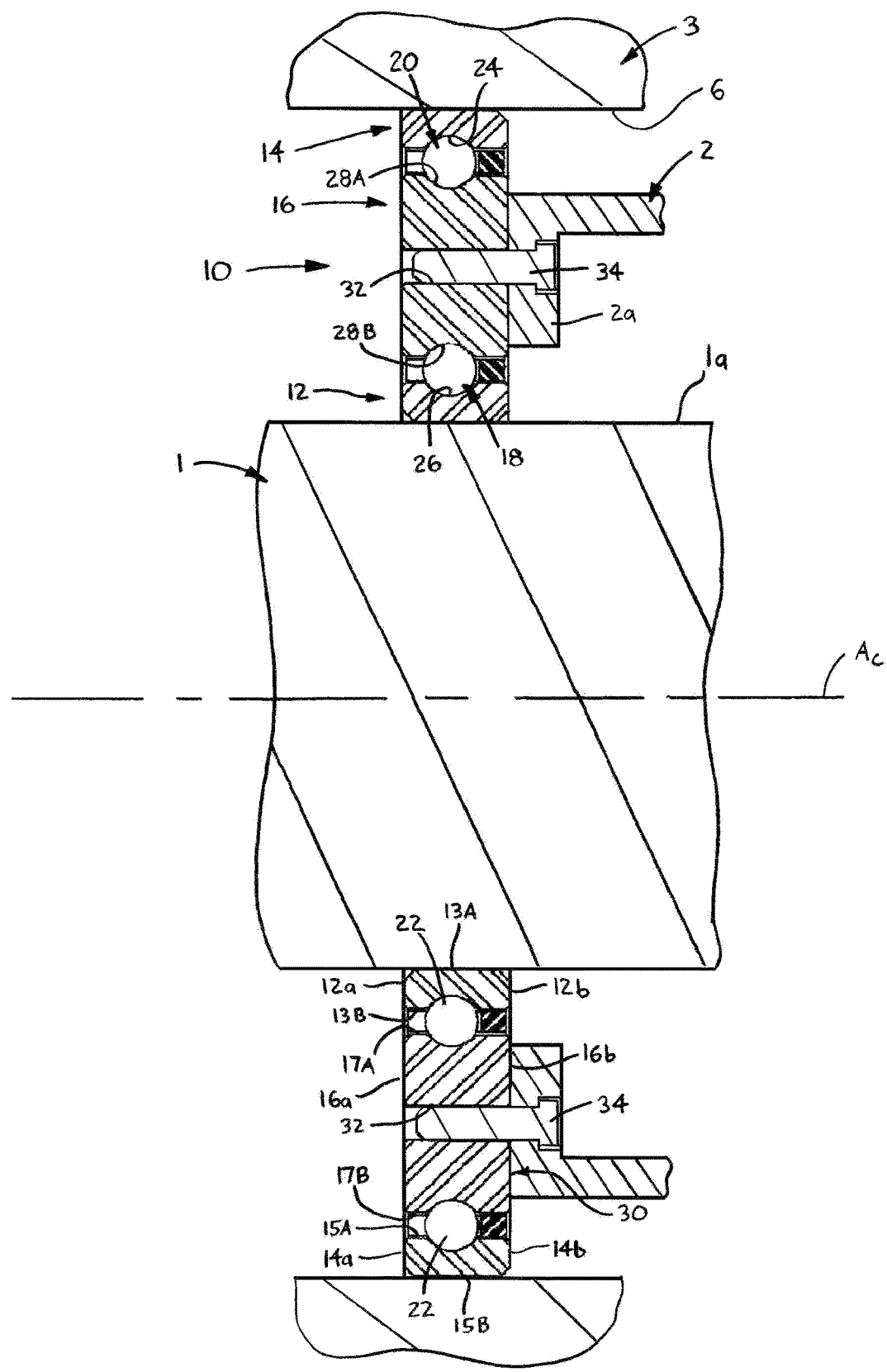
FIG. 2 is another broken-away, axial cross-sectional view of the present bearing assembly, shown rotatably coupling first, second and third members.

Referring now to the drawings in detail, wherein like numbers are used to indicate like elements throughout, there is shown in FIGS. 1-5 a bearing assembly for rotatably coupling at least a first member 1 and a second member 2, and also a third member 3 (FIG. 3) in certain applications, as discussed below. The second member 2 is rotatable about a central axis $A_C$ extending through the first member 1 and may be partially or entirely disposed about the first member 2, as shown in FIG. 2, but may be axially spaced from the first member, as depicted in FIG. 1. Basically, the bearing assembly 10 comprises an inner ring 12, an outer ring 14, a middle ring 16, and first and second sets 18, 20 of rolling elements 22.

More specifically, the inner ring 12 is disposable about the first member 1 and has opposing axial ends 12a, 12b, inner and outer circumferential surfaces 13A, 13B, respectively, and an inner raceway 24 formed in the outer circumferential surface 13B. The inner ring 12 has an axial width $w_1$ between the axial ends 12a, 12b and a radial thickness $t_1$ between the inner and outer circumferential surfaces 13A, 13B, the inner circumferential surface 13A preferably being frictionally engageable with an outer surface 1a of the first member 1. The outer ring 14 is disposed about the inner ring 12 and is disposable within a bore 5 of the first member 1 (FIG. 1) or within a bore 6 (FIG. 2) of the third member 3 disposed about the first member 1. The outer ring 14 has opposing axial ends 14a, 14b, inner and outer circumferential surfaces 15A, 15B, respectively, and an outer raceway 26 formed in the inner circumferential surface 15A. The outer ring 14 has an axial width $w_O$ between the axial ends 14a, 14b and a radial thickness to between the inner and outer circumferential surfaces 15A, 15B. Also, the outer ring 14 has an outside diameter $OD_O$ (FIG. 4) at the outer circumferential surface 15B, the outer surface 15B preferably being frictionally engageable with the bore 5 or 6.

Further, the middle ring 16 is disposed between the inner ring 12 and the outer ring 14 and has opposing axial ends 16a, 16b and inner and outer circumferential surfaces 17A, 17B, respectively. The middle ring 16 has an axial width $w_M$ between the axial ends 16a, 16b and a radial thickness $t_M$ between the inner and outer circumferential surfaces 17A, 17B. An inner intermediate raceway 28A is formed in the inner circumferential surface 17A and faces the inner raceway 24 and an outer intermediate raceway 28B is formed in the outer circumferential surface 17B and faces the outer raceway 26. Also, the middle ring 16 is configured to connect with the second member 2 so as to be rotatable about the central axis $A_C$, i.e., the middle ring 16 rotates along with the second member 2, as discussed in further detail below.

Furthermore, the first set 18 of rolling elements 22 is disposed between the inner ring 12 and the middle ring 16 so as to be rollable simultaneously along the inner raceway 24 and along the inner intermediate raceway 28A during rotation of the middle ring 16. Further, the second set 20 of rolling elements 22 is disposed between the outer ring 14 and the middle ring 16 so as to be rollable simultaneously along the outer raceway 26 and along the outer intermediate raceway 28B during rotation of the middle ring 16. Thus, the middle ring 16 and both sets 18, 20 of rolling elements 22 rotate or circulate about the central axis $A_C$ while the inner ring 12 (and the inner member 1) and the outer ring 14 (and the connected first member 1 or third member 3) remain stationary. Preferably, the rolling elements 22 are balls as depicted, but may alternatively be cylindrical rollers, tapered rollers, needles or any other known rolling element (no alternatives shown).

In order to the minimize the axial "footprint" or axial space requirements of the bearing assembly 10, the assembly 10 is preferably formed or configured as what is commonly referred to in the bearing industry as a "thin section bearing". In other words, the bearing assembly 10 has a relatively large outside diameter in comparison with the axial width or axial thickness of the bearing assembly 10. Specifically, the outer ring 14 is preferably formed or fabricated such that a ratio of the outside diameter $OD_O$ to the axial width $w_O$ is greater than eight to one (8:1), and most preferably greater than ten to one (10:1). Such relative sizing of the outer ring 10 minimizes an axial space required to install the bearing assembly 10 within the first member 1 or between the first member 1 and the third member 3. Further, the bearing assembly 10 is preferably formed such that the inner raceway 24, the outer raceway 26, the inner intermediate raceway 28A and the outer intermediate raceway 28B are all concentric, as opposed to being axially offset or "staggered", which would detrimentally increase the axial size of the bearing assembly 10.

Preferably, the bearing assembly 10 is formed such that the axial width of each of the rings 12, 14 and 16 is generally uniform or constant. That is, the axial width $w_1$ of the inner ring 12 is about equal to the axial width $w_O$ of the outer ring 14 and the axial width $w_M$ of the middle ring 12 is also about equal to the axial width $w_O$ of the outer ring 14. However, the middle ring 16 is preferably formed with a greater radial size or extent in comparison to the radial sizing/extent of each of the inner ring 12 and the outer ring 14. Specifically, the middle ring 16 is preferably sized such that a ratio of the radial thickness $t_M$ of the middle ring 16 to the radial thickness $t_1$ of the inner ring 12 or to the radial thickness to of the outer ring 14 is at least four to one (4:1). In other words, the radial thickness $t_M$ of the middle ring 16 is preferably at least four times greater than either the radial thickness $t_1$ of the inner ring 12 or the radial thickness to of the outer ring 14.

Figure 3:
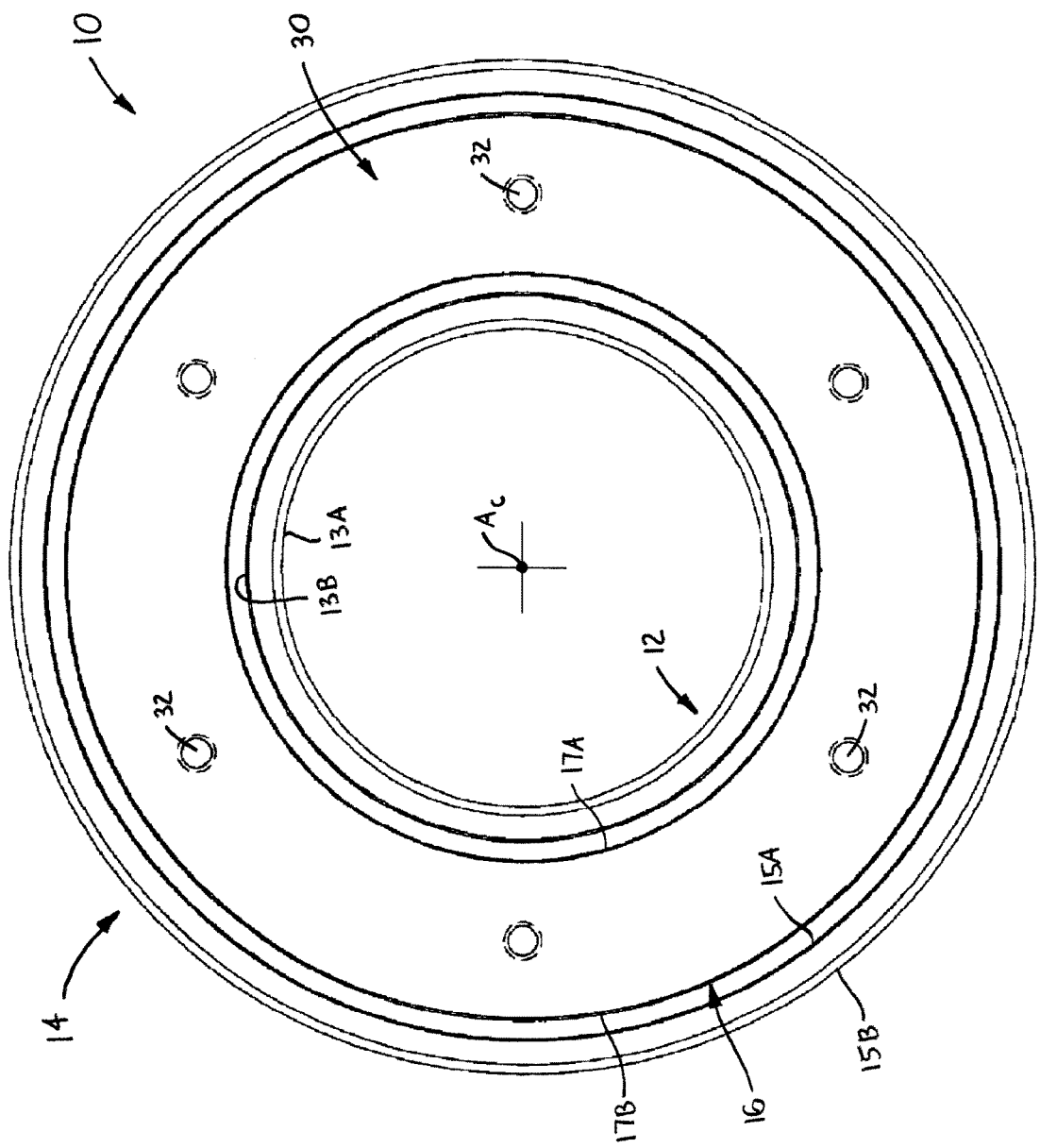
FIG. 3 is a side plan view of the bearing assembly.
Figure 4:
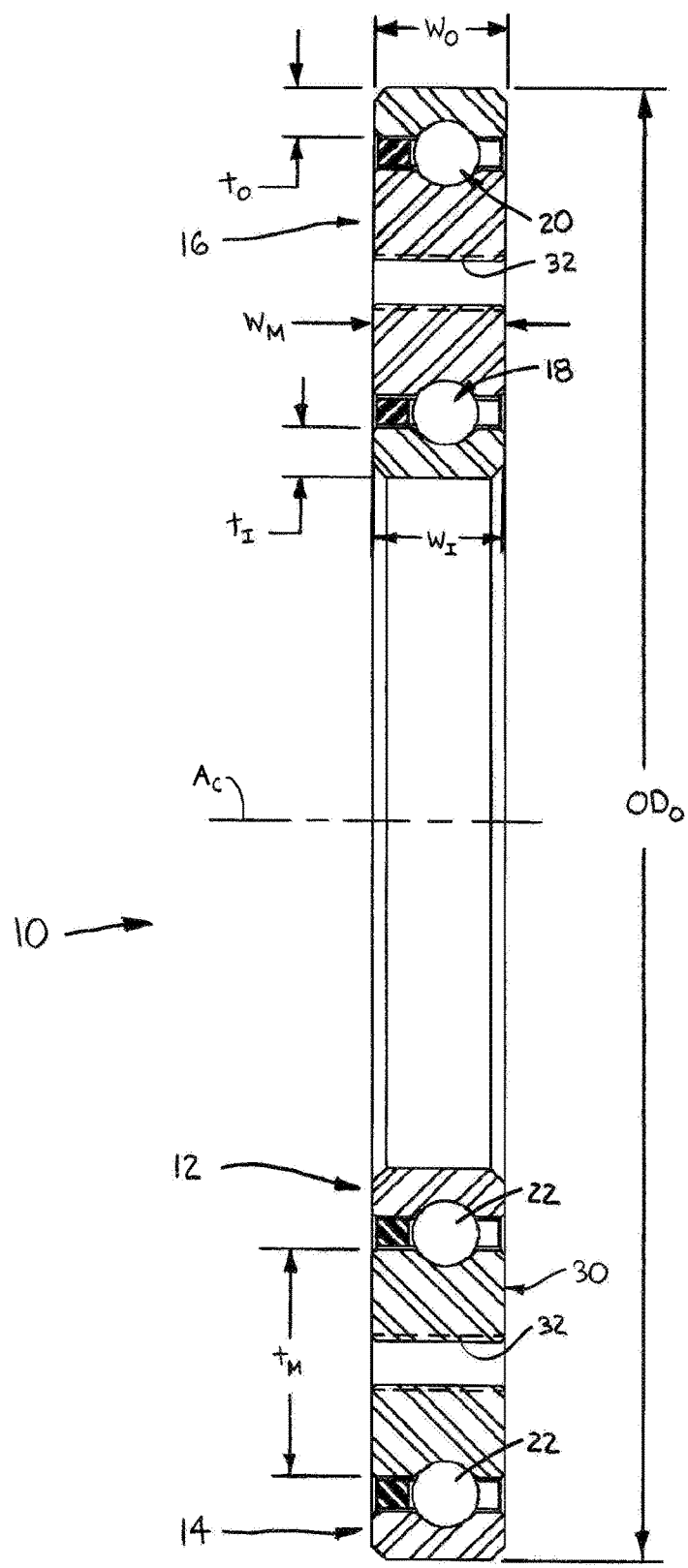
FIG. 4 is an axial cross-sectional view of the bearing assembly.
Figure 5:
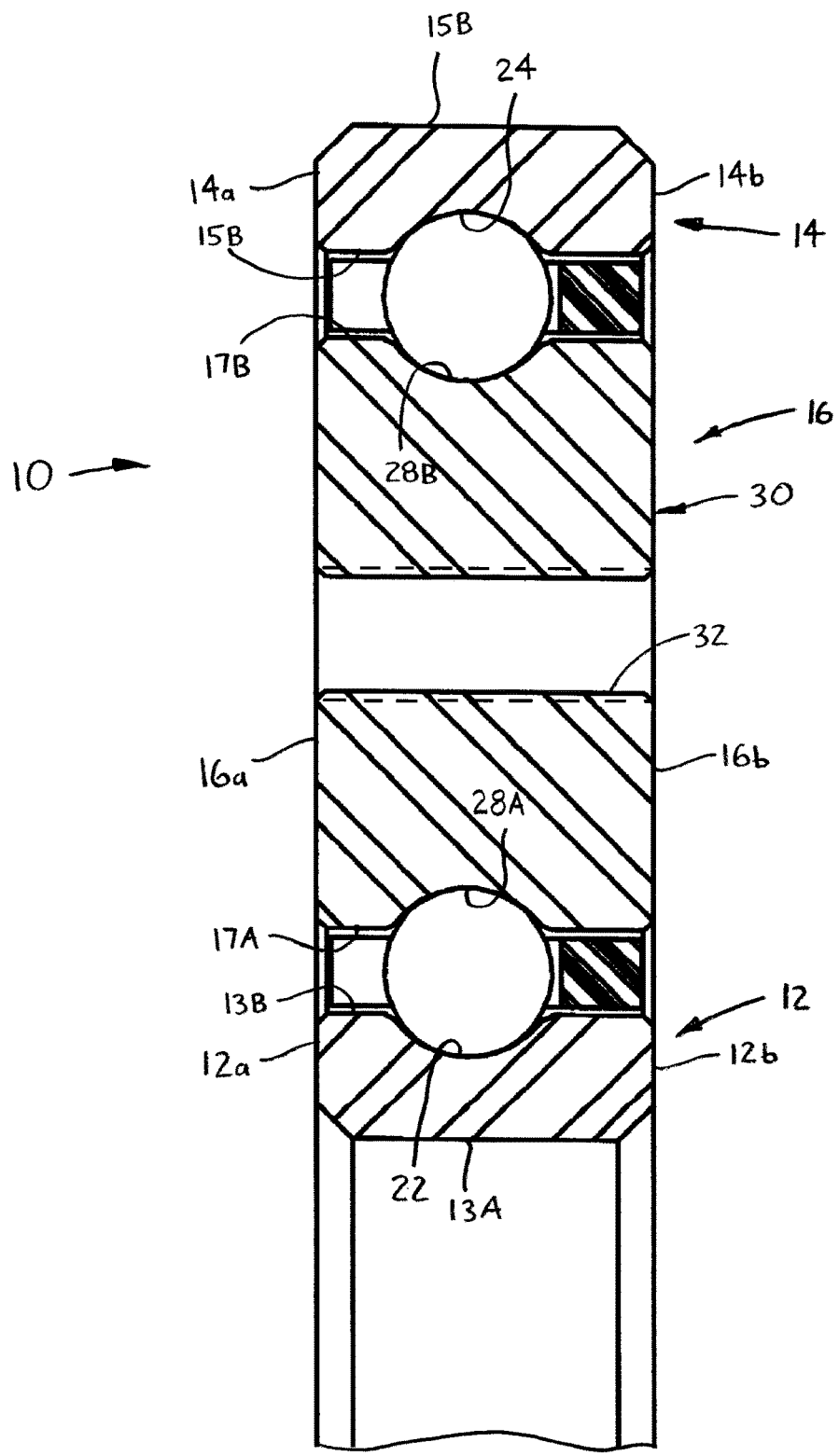
FIG. 5 is a broken-away, enlarged axial cross-sectional view of an upper portion of the bearing assembly.

Referring particularly to FIG. 3, by forming the middle ring 16 with a greater radial thickness or "extent", the bearing assembly 10 has a connection interface 30 with a relatively substantial surface area for coupling or connecting with the second member 2. With such a connection interface 30, the bearing assembly 10 may be used with different second members 2 of varying radial dimensions. Preferably, the middle ring 16 has a plurality of openings 32 spaced circumferentially about the central axis $A_C$, and extending axially inwardly from the interface 30. Each opening 32 is configured to receive a portion of a fastener 34 (e.g., a bolt or screw) or a portion of a coupler (e.g., a pin; none shown) so as to connect the middle ring 16 with the second member 2, e.g., by clamping a section 2a of second member 2 against the ring interface 30. The openings 32 may be provided at any radial location on the interface 30, in any desired number (e.g., six openings 32, ten openings 32, etc.) and/or in any desired pattern, such as evenly circumferentially spaced apart or angularly "staggered" (i.e., circumferentially spaced apart unevenly). Further, the openings 32 may be through holes and/or threaded holes, the depicted openings 32 being threaded through holes, but may be non-threaded through holes for receiving pins, blind threaded holes, or formed in any other desired, conventional manner.

In order to facilitate the manufacturing or fabrication of the present bearing assembly 10, the middle ring 16 is preferably formed of a material different than a material of the inner ring 12 and different than a material of the outer ring 14. Preferably, the material of the inner ring 12 is the same as the material of the outer ring 14, but the outer and inner rings 12, 14 may be formed of different materials such that the bearing assembly 10 is formed of three distinct materials. Also, the material of each of the inner ring 12 and of the outer ring 14 is preferably 52100 alloy steel or 440C stainless steel and the material of the middle ring 16 is 4140 alloy steel, 4143 alloy steel or 4150 alloy steel. Further, the middle ring 16 is also preferably hardened to a lesser extent than both the inner ring 12 and the outer ring 14, thereby facilitating machining of the middle ring 16, particularly in forming the openings 32.

Preferably, each one of the inner ring 12 and the outer ring 14 is hardened to a value of at least fifty on the Rockwell hardness C scale (50 HRc) and the middle ring 16 is hardened to a value of no greater than forty on the Rockwell hardness C scale (40 HRc). Most preferably, the inner ring 12 and the outer ring 14 are each formed of 52100 alloy steel and heat treated to fifty-eight on the Rockwell hardness C scale (58 HRc) and the middle ring 16 is formed of 4140 alloy steel and heat treated to thirty-two on the Rockwell hardness C scale (32 HRc).

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A bearing assembly for rotatably coupling at least a first member and a second member, the second member being rotatable about a central axis extending through the first member, the bearing assembly comprising:
   an inner ring disposable about the first member and having an inner raceway;
   an outer ring disposed about the inner ring and disposable within a bore of the first member or within a bore of a third member disposed about the first member, the outer ring having an outer raceway;
   a middle ring disposed between the inner ring and the outer ring and having an inner intermediate raceway facing the inner raceway and an outer intermediate raceway facing the outer raceway, the middle ring being configured to connect with the second member so as to be rotatable about the central axis;
   a first set of rolling elements disposed between the inner ring and the middle ring so as to be rollable along the inner raceway and along the inner intermediate raceway during rotation of the middle ring; and
   a second set of rolling elements disposed between the outer ring and the middle ring so as to be rollable along the outer raceway and along the outer intermediate raceway during rotation of the middle ring;
   wherein the middle ring is formed of a material different than a material of the inner ring and different than a material of the outer ring, each one of the inner ring and the outer ring is hardened to a value of at least fifty on the Rockwell hardness C scale (50 HRc), and the middle ring is hardened to a value of no greater than forty on the Rockwell hardness C scale (40 HRc).

2. The bearing assembly as recited in claim 1 wherein:
   the material of the inner ring and the material of the outer ring is one of 52100 alloy steel and 440C stainless steel; and
   the material of the middle ring is one of 4140 alloy steel, 4143 alloy steel and 4150 alloy steel.

3. The bearing assembly as recited in claim 1 wherein the outer ring has an outside diameter and an axial width and is sized such that a ratio of the outside diameter to the axial width is greater than eight to one (8:1) so as to minimize an axial space required to install the bearing assembly within the first member or between the first member and the third member.

4. The bearing assembly as recited in claim 3 wherein the ratio of the outside diameter of the outer ring to the axial width of the outer ring is greater than ten to one (10:1).

5. The bearing assembly as recited in claim 1 wherein the inner ring has an axial width about equal to the axial width of the outer ring and the middle ring has an axial width about equal to the axial width of the outer ring.

6. The bearing assembly as recited in claim 5 wherein:
   the inner ring has an inner circumferential surface, an outer circumferential surface and a radial thickness between the inner and outer circumferential surfaces;
   the outer ring has an inner circumferential surface, an outer circumferential surface and a radial thickness between the inner and outer circumferential surfaces; and
   the middle ring has an inner circumferential surface, an outer circumferential surface and a radial thickness between the inner and outer circumferential surfaces, the middle ring being sized such that a ratio of the radial thickness of the middle ring to the radial thickness of the inner ring or to the radial thickness of the outer ring is at least four to one (4:1).

7. The bearing assembly as recited in claim 1 wherein the material of the inner ring is the same as the material of the outer ring.

8. The bearing assembly as recited in claim 1 wherein the middle ring has a plurality of openings spaced circumferentially about the central axis, each opening being configured to receive a portion of a fastener or a portion of a coupler so as to connect the middle ring with the second member.

9. The bearing assembly as recited in claim 8 wherein each opening is a through hole and/or a threaded hole.

10. The bearing assembly as recited in claim 1 wherein the inner raceway, the outer raceway, the inner intermediate raceway and the outer intermediate raceway are all concentric and/or each rolling element of the first set of rolling elements and each rolling element of the second set of rolling elements is a ball.

11. A bearing assembly for rotatably coupling at least a first member and a second member, the second member being rotatable about a central axis extending through the first member, the bearing assembly comprising:
   an inner ring disposable about the first member and having an inner raceway;
   an outer ring disposed about the inner ring and disposable within a bore of the first member or within a bore of a third member disposed about the first member, the outer ring having an outer raceway;
   a middle ring disposed between the inner ring and the outer ring and having an inner intermediate raceway facing the inner raceway and an outer intermediate raceway facing the outer raceway, the middle ring being configured to connect with the second member so as to be rotatable about the central axis;
   a first set of rolling elements disposed between the inner ring and the middle ring so as to be rollable along the inner raceway and along the inner intermediate raceway during rotation of the middle ring; and
   a second set of rolling elements disposed between the outer ring and the middle ring so as to be rollable along the outer raceway and along the outer intermediate raceway during rotation of the middle ring;
   wherein the outer ring has an outside diameter and an axial width and is sized such that a ratio of the outside diameter to the axial width is greater than eight to one (8:1) so as to minimize an axial space required to install the bearing assembly within the first member or between the first member and the third member; and
   wherein the material of the inner ring and the material of the outer ring is one of 52100 alloy steel and 440C stainless steel, each one of the inner ring and the outer ring is hardened to a value of at least fifty on the Rockwell hardness C scale (50 HRc), the material of the middle ring is one of 4140 alloy steel, 4143 alloy steel and 4150 alloy steel and the middle ring is hardened to a value of no greater than forty on the Rockwell hardness C scale (40 HRc).

12. The bearing assembly as recited in claim 11 wherein the ratio of the outside diameter of the outer ring to the axial width of the outer ring is greater than ten to one (10:1).

13. The bearing assembly as recited in claim 11 wherein the inner ring has an axial width about equal to the axial width of the outer ring and the middle ring has an axial width about equal to the axial width of the outer ring.

14. The bearing assembly as recited in claim 13 wherein:
the inner ring has an inner circumferential surface, an outer circumferential surface and a radial thickness between the inner and outer circumferential surfaces;
the outer ring has an inner circumferential surface, an outer circumferential surface and a radial thickness between the inner and outer circumferential surfaces; and
the middle ring has an inner circumferential surface, an outer circumferential surface and a radial thickness between the inner and outer circumferential surfaces, the middle ring being sized such that a ratio of the radial thickness of the middle ring to the radial thickness of the inner ring or to the radial thickness of the outer ring is at least four to one (4:1).

\* \* \* \* \*